C. STREIT.
Rocking-Chairs.

No. 158,869.

Patented Jan. 19, 1875.

Attest
Th. Hunter
Edgar Gross

Inventor
Charles Streit
By F. Millward
Attorney

UNITED STATES PATENT OFFICE.

CHARLES STREIT, OF CINCINNATI, OHIO.

IMPROVEMENT IN ROCKING-CHAIRS.

Specification forming part of Letters Patent No. 158,869, dated January 19, 1875; application filed September 28, 1874.

*To all whom it may concern:*

Be it known that I, CHARLES STREIT, of Cincinnati, Hamilton county, State of Ohio, have invented certain new and useful Improvements in Rocking-Chairs, of which the following is a specification:

My invention relates to a class of chairs, cribs, &c., made to vibrate on rockers resting on a platform, and secured thereto by flat metal bars; and consists, first, of a peculiar means of securing the flexible metal retaining brace or spring to the rockers, said means consisting of a hinged leaf upon the ends of the spring swiveling upon bolts in the rockers; second, of a means of securing above-mentioned flexible retaining-brace to the platform upon which the rockers rest and vibrate, consisting of elastic bearings, between which the spring passes, and which are secured by bolts. My whole invention furnishes a means of attachment which will not so fret the spring when in action as to cause it to fracture, and thereby an important fault in the old rigid connection is remedied.

Figure 1:
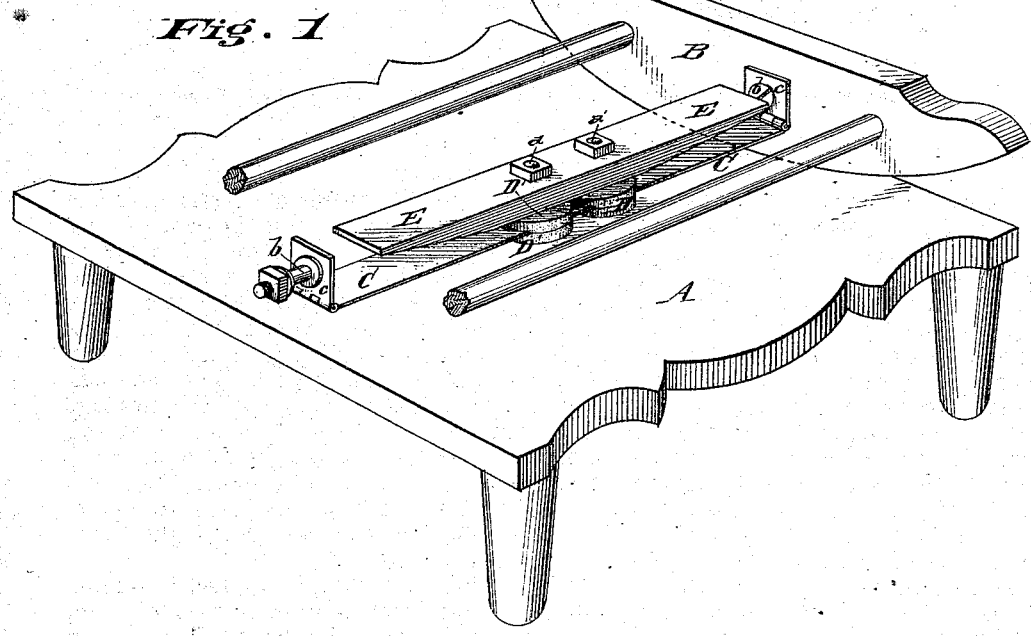
Figure 2:
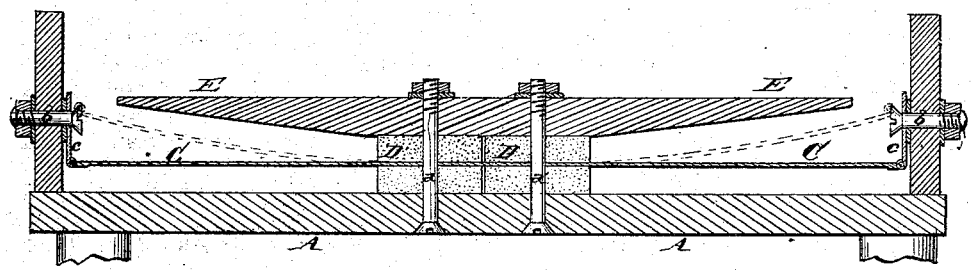

Figure 1 is a perspective view of my improvement. Fig. 2 is a section through same.

A is the platform, upon which rests the chair-rocker frame B. C is the flexible retaining-brace, which is secured to the rocker-frame B by means of bolts $b$ passing through the hinged leaves $c$ $c$, and bolted loosely to the rockers, so as to allow said leaves to swivel. By thus securing the ends of the brace to the rockers, by means of the hinged leaves $c$ $c$, which swivel on the bolts $b$, I provide against the fretting of the spring and ultimate fracture of the same. For a similar purpose I secure the middle of the spring or brace to the platform A by means of elastic bearings D D', in which it rests, said bearings being secured with it to the platform by means of bolts $a$ $a'$. Resting over and secured to the bearings D D is a safety-rod, E, employed to prevent the brace from vibrating too far. As the retaining-brace C is subjected to a torsional as well as tensile strain when the rockers are in motion, the edges of the bearings D D, were they firm, would tend to wear and fret the brace, and finally cause it to snap, while, being as they are of elastic material, they give sufficiently under pressure to destroy any sharp edge which they might otherwise present to the spring.

The spring, as shown, is applied to a rocking-chair, but, when applied to a child's crib, the distance between the rockers being much greater, I use two retaining-springs, C, having separate bearings D D and separate steps E to prevent the springs from vibrating too far.

I claim—

1. The platform A and rocker-frame B, in combination with the brace or braces C, which are centrally connected to the platform, and hinged leaves $c$ $c$, substantially as specified.

2. The platform A and rocker-frame B, in combination with the elastic bearings D D and brace or braces C, substantially as specified.

In testimony of which invention I hereunto set my hand.

CHARLES STREIT.

Witnesses:
EDGAR J. GROSS,
R. M. HUNTER.